United States Patent
Alex et al.

(10) Patent No.: US 9,674,868 B2
(45) Date of Patent: Jun. 6, 2017

(54) LEVERAGING MULTIPLE ACCESS TECHNOLOGIES SIMULTANEOUSLY

(71) Applicant: CISCO TECHNOLOGY, INC., San Jose, CA (US)

(72) Inventors: Arun C. Alex, Nashua, NH (US); Stinson Mathai, Wheaton, IL (US); Aeneas Dodd-Noble, Andover, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/940,514

(22) Filed: Nov. 13, 2015

(65) Prior Publication Data

US 2016/0073423 A1 Mar. 10, 2016

Related U.S. Application Data

(63) Continuation of application No. 13/485,254, filed on May 31, 2012.

(51) Int. Cl.
| | |
|---|---|
| *H04W 74/00* | (2009.01) |
| *H04W 72/12* | (2009.01) |
| *H04W 76/02* | (2009.01) |
| *H04L 12/54* | (2013.01) |
| *H04W 12/06* | (2009.01) |

(Continued)

(52) U.S. Cl.
CPC ......... *H04W 74/00* (2013.01); *H04L 12/5692* (2013.01); *H04L 61/2007* (2013.01); *H04W 12/06* (2013.01); *H04W 72/1215* (2013.01); *H04W 76/022* (2013.01); *H04W 76/025* (2013.01); *H04L 63/304* (2013.01); *H04W 12/02* (2013.01); *H04W 28/08* (2013.01); *H04W 88/06* (2013.01); *H04W 88/16* (2013.01)

(58) Field of Classification Search
CPC ..................... H04W 28/0252–28/0268; H04W 28/08–28/12; H04W 72/042; H04W 72/1215; H04W 72/1257; H04W 72/1263–72/1278; H04W 72/1289–72/1294; H04W 74/006; H04W 74/02; H04W 74/00; H04W 76/025; H04W 76/022; H04L 12/5692
See application file for complete search history.

(56) References Cited

U.S. PATENT DOCUMENTS

| | | |
|---|---|---|
| 9,439,214 B2 | 9/2016 | Alex et al. |
| 2006/0218298 A1 | 9/2006 | Knapp et al. |

(Continued)

OTHER PUBLICATIONS

3GPP TS 22.278 v11.4.0 (Sep. 2011), "3rd Generation Partnership Project; Techincal Specification Group Services and System Aspects; Service Requirements for the Evolved Packet System (Release 11)", Sep. 2011, 33 pages.

(Continued)

*Primary Examiner* — Eric Myers
(74) *Attorney, Agent, or Firm* — Patent Capital Group

(57) ABSTRACT

Systems and method are provided that allow a mobile device to communicate over multiple access technologies at the same time, including a cellular access technology, such as LTE, and via an untrusted WLAN access. The untrusted access is initiated via internet key exchange. The mobile device uses the same IP address over both access technologies.

22 Claims, 3 Drawing Sheets

(51) Int. Cl.
| | |
|---|---|
| H04L 29/12 | (2006.01) |
| H04W 28/08 | (2009.01) |
| H04L 29/06 | (2006.01) |
| H04W 12/02 | (2009.01) |
| H04W 88/06 | (2009.01) |
| H04W 88/16 | (2009.01) |

(56) References Cited

U.S. PATENT DOCUMENTS

| | | |
|---|---|---|
| 2007/0297378 A1 | 12/2007 | Poyhonen et al. |
| 2009/0129342 A1 | 5/2009 | Hwang et al. |
| 2010/0080172 A1* | 4/2010 | Jin ................ H04W 60/005 370/328 |
| 2010/0097981 A1 | 4/2010 | Kant et al. |
| 2010/0128696 A1 | 5/2010 | Fantini et al. |
| 2010/0208698 A1 | 8/2010 | Lu et al. |
| 2011/0040836 A1 | 2/2011 | Allen et al. |
| 2011/0090794 A1 | 4/2011 | Cherian et al. |
| 2011/0179437 A1 | 7/2011 | Foti |
| 2011/0216743 A1* | 9/2011 | Bachmann ........... H04L 63/164 370/331 |
| 2012/0054809 A1 | 3/2012 | Chowdhury et al. |
| 2012/0263041 A1 | 10/2012 | Giaretta et al. |
| 2013/0031271 A1 | 1/2013 | Bosch et al. |
| 2013/0070596 A1 | 3/2013 | Yeh et al. |
| 2013/0097418 A1 | 4/2013 | Bhatt et al. |
| 2013/0322347 A1 | 12/2013 | Alex et al. |

OTHER PUBLICATIONS

3GPP TS 23.002 v11.2.0 (Mar. 2012), "3rd Generation Partnership Project; Technical Specification Group Services and System Aspects; Network Architecure (Release 11)", Mar. 2012, 96 pages.
3GPP TS 23.003 v11.1.0 (Mar. 2012); "3rd Generation Partnership Project; Technical Specification Group Core Network and Terminals; Numbering, Addressing and Identification (Release 11)", Mar. 2012, 81 pages.
3GPP TS 23.234 v10.0.0 (Mar. 2011), "3rd Generation Partnership Project; Technical Specification Group Services and System Aspects; 3GPP System to Wireless Local Area Network (WLAN) Interworking; System Description (Release 10)", Mar. 2011, 84 pages.
3GPP TS 23.261 v10.2.0 (Mar. 2012) "3rd Generation Partnership Project; Technical Specification Group Services and System Aspects; IP Flow Mobility and Seamless Wireless Local Area Network (WLAN) Offload; Stage 2 (Release 10)", Mar. 2012, 22 pages.
3GPP TS 23.402 v11.2.0 (Mar. 2012), "3rd Generation Partnership Project; TechnicalSpecification Group Services and System Aspects; Architecture Enhancements for Non/3GPP Accesses (Release 11)", Mar. 2012, 251 pages.
3GPP TS 24.302 v11.2.0 (Mar. 2012), "3rd Generation Partnership Project; TechnicalSpecification Group Core Network and Terminals; Access to the 3GPP Evolved Packet Core (EPC) via Non/3GPP Access Networks; Stage 3 (Release 11)", Mar. 2012, 59 pages.
3GPP TS 24.303 v11.1.0 (Dec. 2011), "3rd Generation Partnership Project; TechnicalSpecification Group Core Network and Terminals; Mobility Management Based on Dual/Stack Mobile 1Pv6; Sage 3 (Release 11)", Dec. 2011, 52 pages.
3GPP TS 24.312 v11.2.0 (Mar. 2012), "3rd Generation Partnership Project; Technical Specification Group Core Network and Terminals; Access Network Discovery and Selection Function (ANDSF) Management Object (MO) (Release 11)", Mar. 2012, 159 pages.
3GPP TS 29.273 v11.1.0 (Mar. 2012), "3rd Generation Partnership Project; Technical Specification Group Core Network and Terminals; Evolved Packet System (EPS); 3GPP EPS AAA Interfaces (Release 11)", Mar. 2012, 120 pages.
3GPP TS 29.275 v11.2.0 (Mar. 2012), "3rd Generation Partnership Project; Technical Specification Group Core Network and Terminals; Proxy Mobile 1Pv6 (PMIPv6) based Mobility and Tunnellinq Protocols; Staqe 3 (Release 11)", Mar. 2012, 74 paqes.
3GPP TS 33.234 v11.3.0 (Mar. 2012), "3rd Generation Partnership Project; Technical Specification Group Services and System Aspects; 3G Security; Wireless Local Area Network (WLAN) Interworkinq Security (Release 11)", Mar. 2012, 99 paqes.
3GPP TS 33.402 v10.3.0 (Mar. 2012), "3rd Generation Partnership Project; Technical Specification Group Services and System Aspects; 3GPP System Architecture Evolution (SAE); Security Aspects of Non/3GPP Accesses (Release 10)"; Mar. 2012, 52 pages.
Arkko, et al., "Extensible Authentication Protocol Method for 3rd Generation Authentication and Key Agreement (EAP/AKA)", Network Working Group, RFC 4187, Informational, Jan. 2006, 79 pages.
Giaretta, et al., "Mobile 1Pv6 Bootstrapping in Split Scenario", Network Working Group, RFC 5026, Standards Track, Oct. 2007, 28 pages.
Gundavelli, et al., "Proxy Mobile 1Pv6", Network Working Group, RFC 5213, Standards Track, Aug. 2008, 92 pages.
Johnson, et al., "Mobility Support for 1Pv6", RFC 3775, Network Working Group, Standard Track, Jun. 2004, 165 paqes.
Kaufman, "Internet Key Exchange (IKEv2) Protocol", Network Working Group, RFC 4306, Standards Track, Dec. 2005, 99 pages.
Korhonen, et al., "Diameter Mobile 1Pv6: Support for Home Agent to Diameter Server Interaction", Internet Engineering Task Force (IETF), RFC 5778, Standards Track, Feb. 2010, 34 pages.
Muhanna, et al., "Binding Revocation for 1Pv6 Mobility", Internet Engineering Task Force (IETF), RFC 5846, Jun. 2010, 39 pages.
Soliman, "Mobile 1Pv6 Support for Dual Stack Hosts and Routers", Network Working Group, RFC 5555, Standards Track, Jun. 2009, 41 pages.
Tsirtsis, et al., "Flow Bindings in Mobile 1Pv6 and Network Mobility (NEMO) Basic Support", Internet Engineering Task Force (IETF), RFC 6089, Standards Track, Jan. 2011, 31 pages.
Tsirtsis, et al., "Traffic Selectors for Flow Bindings", Internet Engineering Task Force (IETF), RFC 6088, Standards Track, Jan. 2011, 13 pages.
Wakikawa, et al., "Multiple Care/of Addresses Registration", Network Working Group, RFC 5648, Standards Track, Oct. 2009, 36 pages.

* cited by examiner

LEVERAGING MULTIPLE ACCESS TECHNOLOGIES SIMULTANEOUSLY

RELATED APPLICATION

This Application is a continuation (and claims the benefit of priority under 35 U.S.C. §120) of U.S. application Ser. No. 13/485,254, filed May 31, 2012, entitled "LEVERAGING MULTIPLE ACCESS TECHNOLOGIES SIMULTANEOUSLY," Inventors Arun C. Alex, et al. The disclosure of the prior application is considered part of (and is incorporated by reference in) the disclosure of this application.

FIELD OF THE DISCLOSURE

This disclosure relates generally to managing media protocol requests and media delivery across multiple network interfaces and with multiple access technologies.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points. Wireless communication technologies are used in connection with many user equipment, including, for example, satellite communications systems, portable digital assistants (PDAs), laptop computers, and mobile devices (e.g., cellular telephones). Such devices can connect to a network (e.g., the Internet) as long as the user is within range of such a wireless communication technology.

Mobile subscribers increasingly use applications to experience media, such as watching video and listening to audio. These applications use media protocols to stream media from media servers to clients, such as programs running on personal computers or mobile devices. Example media protocols include adaptive bit rate (ABR) streaming, real time streaming protocol (RTSP), and real-time transport protocol (RTP). These protocols are designed to work efficiently over large and distributed networks such as the Internet. The demand for media over wireless networks is not expected to slow, especially as mobile devices become more sophisticated and as users become more dependent on mobile devices.

DESCRIPTION OF EXAMPLE EMBODIMENTS

Overview

Figure 1:
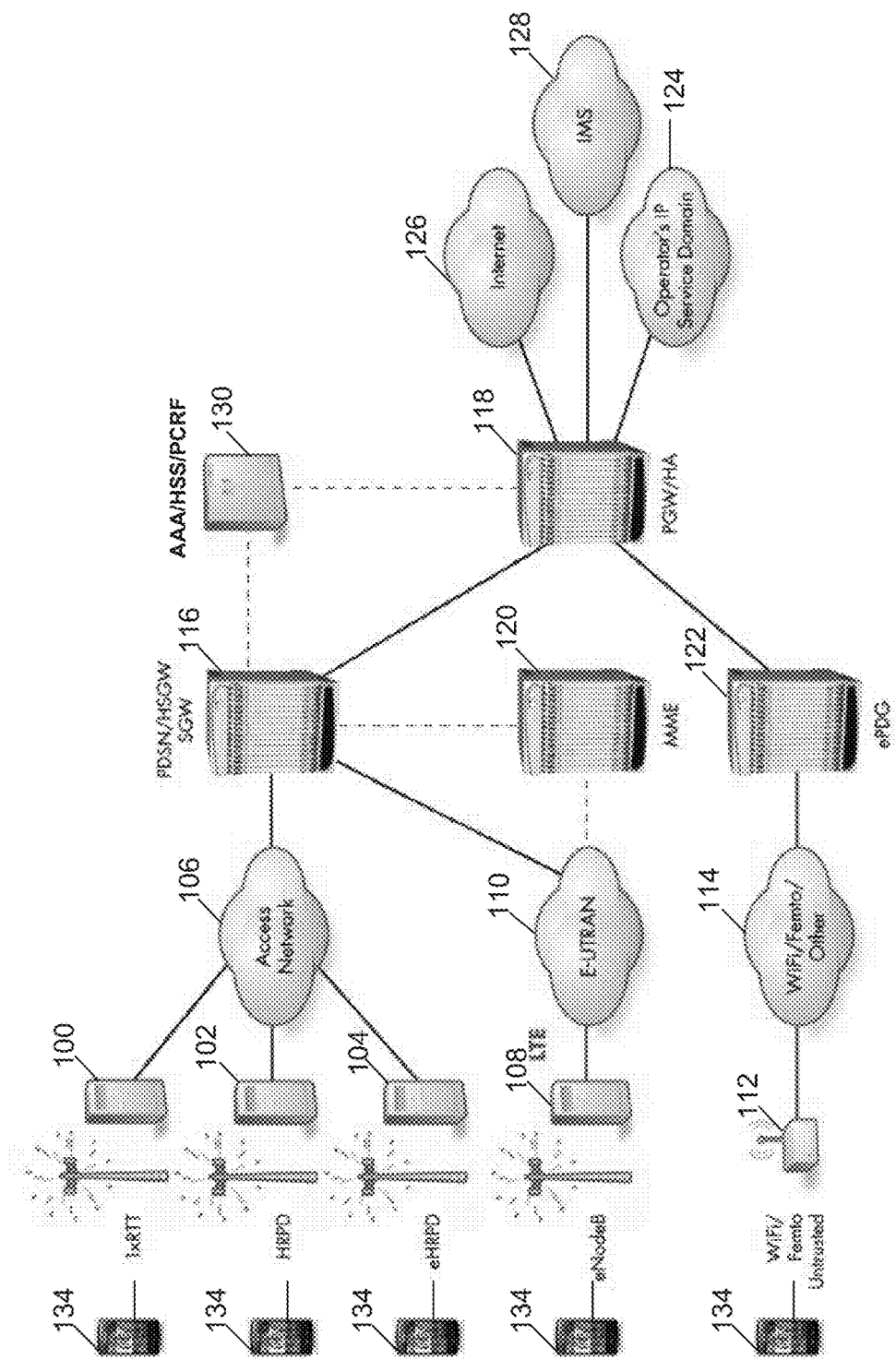
FIG. 1 illustrates a communication network for multiple-interface media protocol session management including a long term evolution (LTE) topology in accordance with certain embodiments.

The embodiments described here include a gateway capable of communicating with a mobile device via a cellular access technology, such as 3GPP Long Term Evolution (LTE) or 3GPP2 eHRPD, and also via a non-cellular access technology, preferably though internet key exchange (IKE), such as untrusted wireless local area network (WLAN) access. The gateway can assign to the mobile device the same IP address for communications over both access technologies. The gateway can cause different flows to go to the mobile device via both access technologies in a way that is determined by rules. The gateway can also install rules in the mobile device to cause different flows to go to the gateway via different access technologies based, for example, on the preference and/or connectivity. In one example, in a videoconference, video can be sent via WLAN, with audio sent via LTE. A mobile device can access a gateway via such cellular and non-cellular technologies, use one IP address, and have rules, such as with filters, such as traffic flow templates (TFTs), to decide which access technology to use. This way the network can control the utilization of the available wireless resources effectively, without affecting the user experience.

Example Embodiments

This disclosure generally relates to requesting media content over a variety of interfaces and requesting media content from more than one interface at a time. Multimedia, and especially video, can consume large amounts of data and even greater percentages of bandwidth as screen resolution increases on mobile devices and wireless networks become more capable. As a consumer use model and corresponding video consumption evolves into an increasingly mobile experience, mobile devices and media protocol clients can be enhanced to permit use of multiple interfaces to obtain content from multiple technologies or even parallel networks simultaneously. This transmission can provide more robust performance and a better user experience. This transmission also provides for a graceful fallback if one or more of the wireless access technologies are not present.

Internet applications and services typically rely on a set of media protocols to communicate video and audio multimedia over a network. As one example of communications using media protocols, a user may visit a video streaming web site using a mobile device. When the user chooses a video to view, a program running on the mobile device contacts a video server on the Internet to request a video stream using the media protocols. The video server streams the requested video to the program on the mobile device using media protocols. Given the relatively large size of some media files, many web sites stream media so that users will not have to wait for a lengthy download to complete. In streaming, the client program running on a mobile device is able to begin playback upon receiving partial fragments of the complete media file.

There are many applications that are available to end users from the devices. These applications vary in requirements of factors such as bandwidth and latency. Combine these factors with the service provider's requirements of charging for certain types of bandwidth (quality of service, or QoS, enabled) versus others, and the initiatives for offloading traffic off the macro network. In the end, regardless of the initiatives, it is desirable that the end user experience not be degraded.

This combination of initiatives provides for some problems to be solved. A core network provides an IP anchor point for multiple access technologies and packet data networks (PDNs). At this point this happens only in a "linear" fashion where an access technology and a PDN are tied together at a device and this combination has its own IP address anchored in the core network. The limitation with this approach is that the device, and more specifically the application on the device, can only use one access technology at a time.

The present disclosure provides seamless mobility and the ability to use access technologies in an aggregate fashion so that an application can take advantage of multiple technologies available to the device.

In one embodiment, the device in discussion has a wireless LAN (e.g., WiFi) capacity and a cellular (e.g., LTE) capacity, such as through separate chipsets. When the device attaches to the LTE network, it will get an IP address for this access point name (APN) from the PDN gateway (PGW). When the device attaches to the WiFi network for the same APN, it keeps the same IP address as assigned over LTE.

This solution leverages standard IKE security procedures but adds intelligence in an enhanced packet data gateway (ePDG) to map 5-tuples in the IKE configuration request to flow IDs in a PMIP6 interface to the PGW. The network can validate these IP flows and can modify them as necessary as the UE must accept the Traffic Selectors that are returned to the UE in IKE signaling.

The idea leverages some S2c components but uses them in a new way to simplify the implementation on the UE and allow the network to control the user's experience. To implement this, it is possible to limit the changes to the ePDG and the PGW, leaving other nodes in the network untouched, and to accomplish the simultaneous access without the need of an Access Network Discovery and Selection Function (ANDSF).

Both access technologies can be attached in a way that shares a common IP address at the gateway. When a device initiates an application, it can decide which access technology to use. There can be policies for this behavior in both the device and the gateway. Essentially an application, when invoked, creates a data flow. This dataflow is typically identified by a 5-tuple, which includes source and destination IP address, source and destination port, protocol type. Other facets of the flow can also be used to identify this data stream.

The mobile device can decide which access technology to use based on a traffic flow template (TFT) provided by the network. The TFT has a number of filters, e.g., up to 8 filters, that allows traffic that matches the filters to be routed on different flows or bearers on a particular PDP context, and thus provide a desired QOS and charging rate. Rather than providing a different TFT for the cellular 3GPP and WiFi non-3GPP access, a single set of filters can be provided for all technologies. The UE can have prioritization rules defined for the different technologies, such as LTE and WiFi, such that it can decide which access technology to use under various situations. For example, it can indicate that the WiFi access is to be used for video when possible.

Using current mechanisms, in a network controlled policy environment, the gateway can signal to the device which access technology to use for a specific data flow. A mechanism is added for describing which access technology to use. The devices, such as servers, peers etc. that are on the Internet side of the gateway (i.e., the devices connected using the Gi interface), do not necessarily have to know which access technology the devices using. But there are situations where a server in the Internet could use the knowledge of which access technology is in use for the benefit of the end-user. An example is that video could be served at a higher bit rate when using WiFi as opposed to when the user is in another technology, such as EV-DO Rev. A (a 3GPP2 technology). In this case the gateway can also preserve the appropriate HTTP headers that may provide an indication of access type, or insert appropriate header extensions to tell the downstream server which access technologies to use. Because the gateway is in control of which access technologies to be used, it can direct the appropriate information to both the device and the server in the network. The mechanisms that drive the policy of which access technology shall be used for which application can be triggered from the gateway as part of the policy negotiations with the end device. This disclosure includes adding extensions to the signaling to enable the use of either access technology.

FIG. 1 illustrates a communication system for multiple-interface media protocol session management including a long term evolution (LTE) topology in accordance with certain embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wireless Local Area Network (i.e., WiFi), Femto, WiMAX, or any other radio spectrum technology, can use a transceiver shown generally at 112 to connect a user equipment (UE) 134 to the network using a broadband or other access network. The UE can include any mobile device such as a laptop, a smartphone, or a tablet computer.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, such as a packet data network gateway (PGW), and a mobility management entity (MME) 120. On the access network side, the anchor gateway 118 can also communicate with an evolved packet data gateway (ePDG) 122 that provides connectivity to the WLAN/Femto/other transceiver 112. On the packet core side, the anchor gateway can communicate with the operator's IP service domain 124, the Internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a UE. Even when the UE 134 is detached from the network, the HSS 130 maintains the binding information until the UE 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR)

can be used in other embodiments. In certain embodiments, the AAA/HSS/PCRF 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP technologies and non-3GPP technologies, such as WLAN and 3GPP2 standards (eHRPD).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-access stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed untrusted non-3GPP access technologies such as a WLAN, WiMAX, LTE metro, and femtocell access networks. The ePDG 122 can use IPSec/IKEv2 to provide secure access to the EPC network. The term "IKE" can refer to past, present, and future versions of Internet Key Exchange. Optionally, the ePDG 122 can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
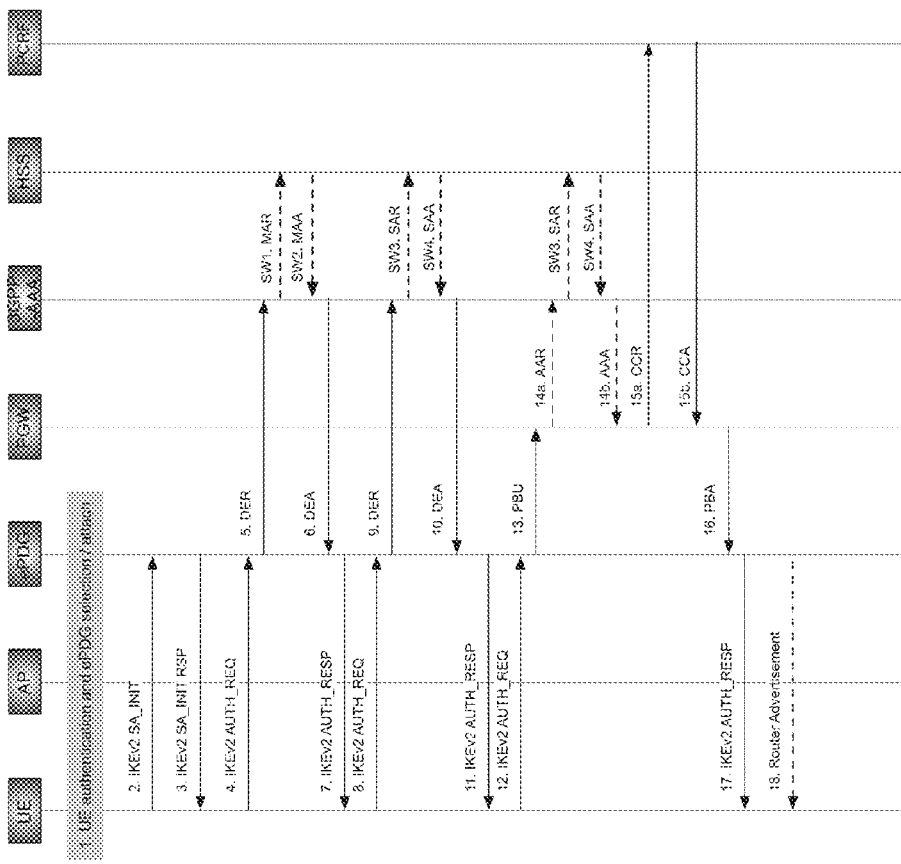
FIG. 2 is a flow diagram showing an embodiment of the disclosure.

Referring also to FIG. 2, an initial attachment procedure illustrates, as an example, the IMS PDN connection with specific traffic selectors for traffic that needs to be sent over WiFi while the rest of the traffic goes over LTE. The UE establishes a PDN connection over an untrusted non-3GPP access with PMIP on S2b when the UE already has an active PDN connection over a 3GPP access, e.g., via an S5 session via a serving gateway (SGW), and wishes to establish simultaneous PDN connections for the same APNs over multiple accesses. The numbers below correspond with the steps/acts shown in FIG. 2.

1 Authentication and ePDG Selection. UE performs initial access point association and authentication if necessary.

2 The UE sends to the ePDG an IKE_SA_INIT Request (SA, KE, Ni, NAT-DETECTION Notify).

3 The ePDG responds with an IKE_SA_INIT Response (SA, KE, Nr payloads, NAT-Detection Notify). The ePDG will start the IKEv2 setup timer when sending the IKE_SA_INIT Response.

4 The UE sends an Auth_Request (IDi, {CERT}|{CERTREQ}, IDr {CP}, SA {CFQ_REQUEST (INTERNAL_IP4_ADDRESS, INTERNAL_IP4_NETMASK INTERNAL_IP6_ADDRESS, INTERNAL_IP6_SUBNET, INTERNAL_IP4_DNS, INTERNAL_IP6_DNS, TSi, TSr, P-CSCF}. The traffic selectors TSi and TSr are defined based on the traffic or TFT that the UE wants to offload to WiFi, e.g., video traffic.

5 The ePDG sends AAA a diameter EAP request (DER).

SW1. The AAA sends the HSS a Multimedia_AUTH_Request (MAR) to retrieve authentication vectors.

SW2 The HSS sends to AAA a Multimedia-_AUTH_Answer (MAA).

6 The AAA sends to ePDG a diameter EAP answer (DEA).

7 The ePDG sends the UE an IKE_AUTH.

8 The UE sends the ePDG an IKE_AUTH Request.

9 The ePDG sends the AAA a DER.

SW3 The AAA sends the HSS a Server Assignment Request (SAR) to obtain a user profile associated with the user.

SW4 The HSS sends the AAA a Server Assignment Answer (SAA).

11 The ePDG sends the UE an IKE_AUTH_Response.

12 The UE sends ePDG an IKE_AUTH_Request.

13 The ePDG sends PGW a proxy binding update (PBU) (for PMIPv6). The ePDG checks the correctness of the AUTH received from the UE. At this point the UE is authenticated. On successful authentication, the ePDG establishes a PMIP tunnel towards PDN-GW by sending the PBU {MN-ID=IMSI-NAI, Lifetime, Access Tech (WLAN), APN, IP address allocation (HNP=0), Link-local-addr, IP Flow}. The IP-Flow parameter includes the flow descriptors sent in the IKE configuration request, thereby communicating the TFT that the UE wants to offload to WLAN.

14a. The PGW sends the 3GPP-AAA an Authorization Application Request (AAR).

14b. The 3GPP-AAA sends the PGW an Authorization Application Answer (AAA).

15a. The PGW sends the policy charging and rules function (PCRF) a Credit Control Request (CCR to request authorization for a service). The PGW sends an indication of IP-CAN establishment to the PCRF with CCR. The PGW includes IP Flow parameters that specify a list of routing filters which were received in the binding update (BU) message. The PCRF can accept, modify or reject the proposed routing filters in the BU.

15b. The PCRF sends the PGW a Credit_Control_Answer (CCA). The PCRF Acknowledges IP CAN Session Establishment with a CCA message. This message includes the policy and charging rules the PGW will enforce, and triggers for events to be reported by the PGW.

16. The PGW allocates the requested IP address, which is the same as the already connected session, and responds back to the ePDG with a Proxy Binding Acknowledgement (PBA) (Cause, Sender F-TEID for C-plane, PGW S2b Address C-plane, PAA, Bearer Contexts Created, Private IE (P-CSCF), Flow ID) message. The Flow ID contains the TFT that the PCRF accepted or modified.

17. The ePDG sends the UE an IKE_AUTH. The ePDG maps the TFT in the Flow ID to the traffic selector and completes the IP Sec for video traffic.

18 The ePDG can send the UE a Router Advertisement if IPv6 addresses are used.

As a result of the process above, a user can get a single IP address to obtain data simultaneously via untrusted, non-3GPP access, such as through WiFi, via an ePDG, while also communicating through 3GPP via an SGW. This allows traffic to be sent simultaneously over both 3GPP and WiFi, including, for example, sending the video portion of a teleconference over WiFi and an audio portion over the cellular. Other use cases for simultaneous flow are provided in 3GPP TR 23.861 versions 1.2 and 1.3.

User Equipment

Figure 3:
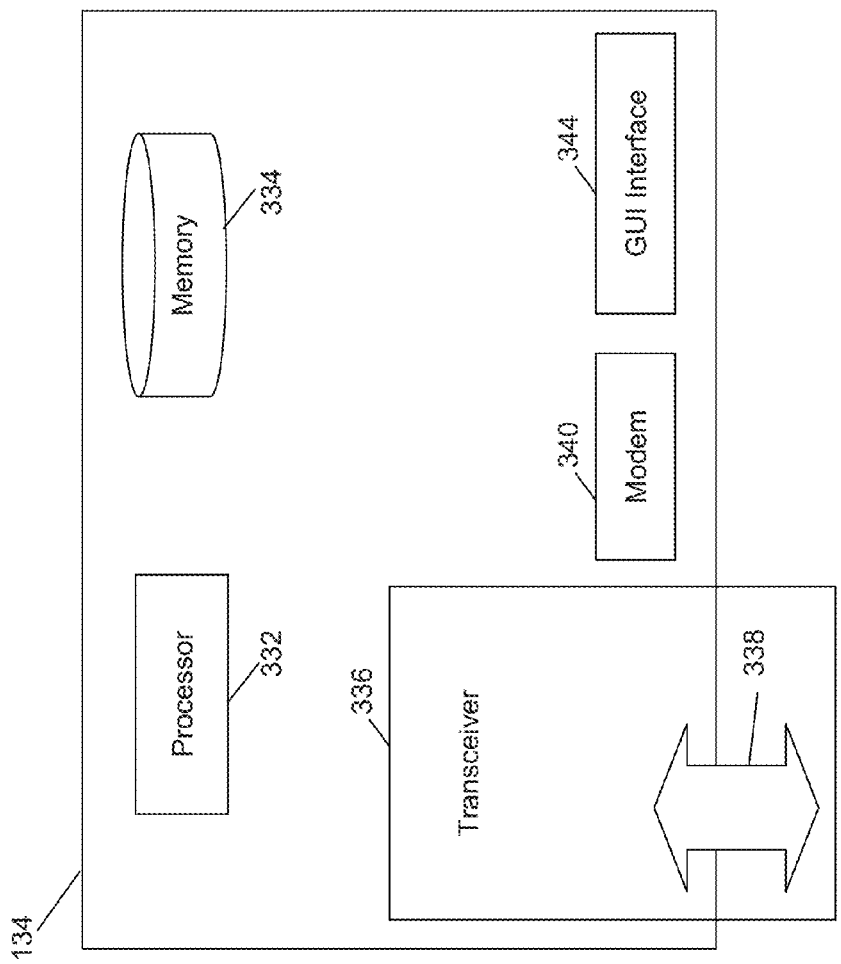
FIG. 3 illustrates a logical view of a user equipment in accordance with certain embodiments.

Referring to FIG. 3, the UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network. The UE 134 also encompasses many other devices such as televisions (TVs), video projectors, set-top boxes or set-top units, digital video recorders (DVR), computers, netbooks, laptops, and any other audio/visual equipment that can communicate with a network.

The UE 134 has a memory that can be used to store the TFT and maintain priority rules for different access technologies. The UE can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

A packet gateway can have components as shown in FIG. 8 and described in paragraphs 56-67 of Publication Number 2012/0054809, which is incorporated herein by reference in its entirety. More specifically, the packet gateway can have interfaces for communicating with mobile devices via cellular and non-cellular access technologies, and/or 3GPP and non-3GPP access technologies, to provide flows simultaneously, a processor, a memory for storing software modules, and tangible memory media for storing software that can be executed by the processor to perform the functions described above. As used here, flows need not be provided literally at the same instant, but at least in a manner in which they appear to be simultaneous to a user, e.g., such that video and audio is correlated.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, while LTE is described, future forms of cellular communication can be used.

We claim:

1. A method comprising:
communicating, by an enhanced packet data gateway (ePDG) with a gateway of a long-term evolution (LTE) network, wherein upon attachment to the gateway by a mobile device through a wireless cellular access technology, the gateway is to provide an Internet Protocol (IP) address to the mobile device, the mobile device to use the IP address as a source IP address to communicate using the wireless cellular access technology during a first packet data network connection for an access point name (APN);

facilitating, by the ePDG, attachment by the mobile device to the gateway through a wireless non-cellular access technology, wherein during attachment the gateway is to allocate the same IP address to the mobile device, the mobile device to use the IP address as its source IP address to communicate using the wireless non-cellular access technology during a second packet data network connection for the APN;

during attachment by the mobile device to the gateway through the wireless non-cellular access technology, receiving by the ePDG from the mobile device, a traffic selector via an Internet Key Exchange (IKE) configuration request, the traffic selector based on traffic to be offloaded to the wireless non-cellular access technology; and sending, by the ePDG to the gateway of the LTE network, at least one flow descriptor from the traffic selector received from the mobile device for validation of the at least one flow descriptor.

2. The method of claim 1, further comprising, providing to the mobile device a single traffic flow template (TFT) applicable for the wireless cellular access technology and the wireless non-cellular access technology, the TFT to allow the mobile device to select the wireless cellular access technology for providing a first data flow associated with a first application and to select the wireless non-cellular access technology for providing a second data flow associated with a second application.

3. The method of claim 2, wherein the TFT comprises information that allows the mobile device to prioritize different types of traffic flows over the wireless cellular access technology and the wireless noncellular access technology, such that at least one type of traffic flow for the APN is provided over the wireless cellular access technology and another type of traffic flow for the APN is provided over the wireless noncellular access technology simultaneously.

4. The method of claim 1, further comprising providing simultaneous data flows to the mobile device via the wireless cellular access technology and the wireless non-cellular access technology.

5. The method of claim 1, further comprising communicating with the mobile device through the non-cellular access technology using the enhanced packet data gateway (ePDG).

6. The method of claim 1, wherein the gateway is a packet data network gateway (PGW) of the LTE network.

7. The method of claim 1, further comprising:
receiving, by the gateway, a request for video content from the mobile device; and
sending, to a server that is to provide the video content, an indication of whether the wireless cellular access technology or the wireless noncellular access technology was used by the mobile device to send the request.

8. The method of claim 1, wherein the traffic selector comprises a Traffic Selector-Initiator (TSi) and a Traffic Selector-Responder (TSr).

9. The method of claim 1, further comprising providing, by the ePDG to the mobile device, a second traffic selector that includes at least one flow descriptor from the traffic selector sent by the mobile device that has been accepted by a policy charging and rules function (PCRF), wherein the at least one flow descriptor of the second traffic selector specifies a source and destination IP address, a source and destination port, and a protocol type.

10. A system comprising:
an enhanced packet data gateway (ePDG) to communicate with a long-term evolution (LTE) network, the ePDG comprising at least one processor, the ePDG to:
communicate with a gateway of the LTE network, wherein upon attachment to the gateway by a mobile device through a wireless cellular access technology, the gateway is to provide an Internet Protocol (IP) address to the mobile device, the mobile device to use the IP address as a source IP address to communicate using the wireless cellular access technology during a first packet data network connection for an access point name (APN);

facilitate attachment by the mobile device to the gateway through a wireless non-cellular access technology, wherein during attachment the gateway is to allocate the same IP address to the mobile device, the mobile device to use the IP address as its source IP address to communicate using the wireless non-cellular access technology during a second packet data network connection for the APN;

during attachment by the mobile device to the gateway through the wireless non-cellular access technology, receive a traffic selector via an Internet Key Exchange (IKE) request, the traffic selector based on traffic to be offloaded to the wireless non-cellular access technology; and send, to the gateway of the LTE network, at least one flow descriptor from the traffic selector received from the mobile device for validation of the at least one flow descriptor.

11. The system of claim 10, wherein the gateway is further to provide to the mobile device a single traffic flow template (TFT) applicable for the wireless cellular access technology and the wireless non-cellular access technology, the TFT to allow the mobile device to select the wireless cellular access technology for providing a first data flow associated with a first application and to select the wireless non-cellular access technology for providing a second data flow associated with a second application.

12. The system of claim 11, wherein the TFT comprises information that allows the mobile device to prioritize different types of traffic flows over the wireless cellular access technology and the wireless noncellular access technology, such that at least one type of traffic flow for the APN is provided over the wireless cellular access technology and another type of traffic flow for the APN is provided over the wireless noncellular access technology simultaneously.

13. The system of claim 10, wherein the gateway is further to provide simultaneous data flows to the mobile device via the wireless cellular access technology and the wireless non-cellular access technology.

14. The system of claim 10, further comprising the gateway.

15. The system of claim 10, wherein the gateway is a packet data network gateway (PGW) of the LTE network.

16. The system of claim 10, the gateway further to:
receive a request for video content from the mobile device; and
send, to a server that is to provide the video content, an indication of whether the wireless cellular access technology or the wireless noncellular access technology was used by the mobile device to send the request.

17. A user equipment comprising:
a processor for executing instructions, stored in a memory device, operable to cause the user equipment to:
attach to a gateway of a long-term evolution (LTE) network through a wireless cellular access technology;
receive, from the gateway, an Internet Protocol (IP) address;
use the IP address as a source IP address to communicate using the wireless cellular access technology during a first packet data network connection for an access point name (APN);

send a traffic selector to an enhanced packet data gateway (ePDG) via an Internet Key Exchange (IKE) configuration request, the traffic selector based on traffic to be offloaded to a wireless non-cellular access technology, wherein at least one flow descriptor from the traffic selector is to be sent by the ePDG to the gateway of the LTE network for validation of the at least one flow descriptor;

attach to the gateway through the wireless non-cellular access technology;

receive, from the gateway, an indication that the same IP address has been allocated to the user equipment; and use the IP address as a source IP address to communicate using the wireless non-cellular access technology during a second packet data network connection for the APN.

18. The user equipment of claim 17, wherein the instructions are further to cause the user equipment to:

receive a single traffic flow template (TFT) applicable for the wireless cellular access technology and the wireless non-cellular access technology; and select, based on the TFT, the wireless cellular access technology for a first data flow associated with a first application and selecting the wireless non-cellular access technology for a second data flow associated with a second application.

19. The user equipment of claim 18, wherein the TFT comprises information that allows the user equipment to prioritize different types of traffic flows over the wireless cellular access technology and the wireless noncellular access technology, such that at least one type of traffic flow for the APN is provided over the wireless cellular access technology and another type of traffic flow for the APN is provided over the wireless noncellular access technology simultaneously.

20. The user equipment of claim 17, wherein the instructions are further to cause the user equipment to communicate using simultaneous data flows via the wireless cellular access technology and the wireless non-cellular access technology.

21. The user equipment of claim 17, wherein the instructions are further to cause the user equipment to communicate through the non-cellular access technology with the enhanced packet data gateway (ePDG).

22. The user equipment of claim 17, wherein the gateway is a packet data network gateway (PGW) of the LTE network.

* * * * *